United States Patent [19]

D'Andrade

[11] 4,269,596

[45] May 26, 1981

[54] TOY AEROPLANE FLIGHT SIMULATING CONSOLE

[75] Inventor: Bruce M. D'Andrade, Whitehouse Station, N.J.

[73] Assignee: Arco Industries Ltd., Kowloon, Hong Kong

[21] Appl. No.: 143,848

[22] Filed: Apr. 25, 1980

[51] Int. Cl.³ .................... G09B 9/08; A63H 27/04
[52] U.S. Cl. ............................. 434/32; 46/1 B
[58] Field of Search ............... 35/12 L, 12 R, 12 F, 35/12 K, 12 Q, 12 S; 273/1 R, 1 G, 1 GA, 1 GC, 1 E; 272/1 C, 31 A; 46/1 B, 1 H, 248

[56] References Cited

U.S. PATENT DOCUMENTS

| | | | |
|---|---|---|---|
| 1,973,592 | 9/1934 | Weisinger | 35/12 L |
| 2,034,298 | 3/1936 | Holman | 35/12 L |
| 2,067,828 | 1/1937 | Christiansen | 272/31 A |
| 2,428,706 | 10/1947 | Hardell | 35/12 L |
| 2,454,693 | 11/1948 | Foster | 35/12 L X |
| 2,526,371 | 10/1950 | Laughead et al. | 35/12 L |
| 2,766,552 | 10/1956 | Odenkirchen | 46/1 B X |
| 3,060,598 | 10/1962 | Gilbert et al. | 35/12 L |
| 3,125,338 | 3/1964 | Hain, Jr. | 272/1 C |
| 3,534,486 | 10/1970 | Frasca et al. | 35/12 L |
| 3,885,325 | 5/1975 | Sidoti | 35/12 F |
| 3,978,609 | 9/1976 | English | 35/12 F X |

FOREIGN PATENT DOCUMENTS 588946  6/1947  United Kingdom ............... 272/31 A Primary Examiner—William H. Grieb
Attorney, Agent, or Firm—C. Hercus Just

[57] ABSTRACT

A toy type flight simulating console for a toy aeroplane comprising a relatively small compact housing completely enclosing all operating components and mechanism except the outer ends of a simulated joystick and motor throttle lever as well as a vertical staff projecting a short distance upwardly from the rear portion of said housing, an instrument panel on the front face of said housing and the housing having a base readily adapted to be supported upon a table top, a model toy aeroplane detachably connected to the upper end of said staff and enclosing an electric D.C. motor in the fuselage to rotate a propeller on the nose thereof, position control and operating mechanism for the aeroplane enclosed within said housing to effect movement of said staff about two horizontal axes at a right-angle to each other respectively to move the aeroplane in ascending and descending attitudes and in left-hand and right-hand banking attitudes, said movement being effected by movement of said simulated joystick, and said motor throttle lever actuating a rheostat in circuit with batteries in the housing to operate the motor and propeller at various speeds. Dials on the instrument panel respectively indicate the attitude of the aeroplane relative to the horizon, rate of ascent and descent, motor speed and RPM of the motor and the like.

10 Claims, 11 Drawing Figures

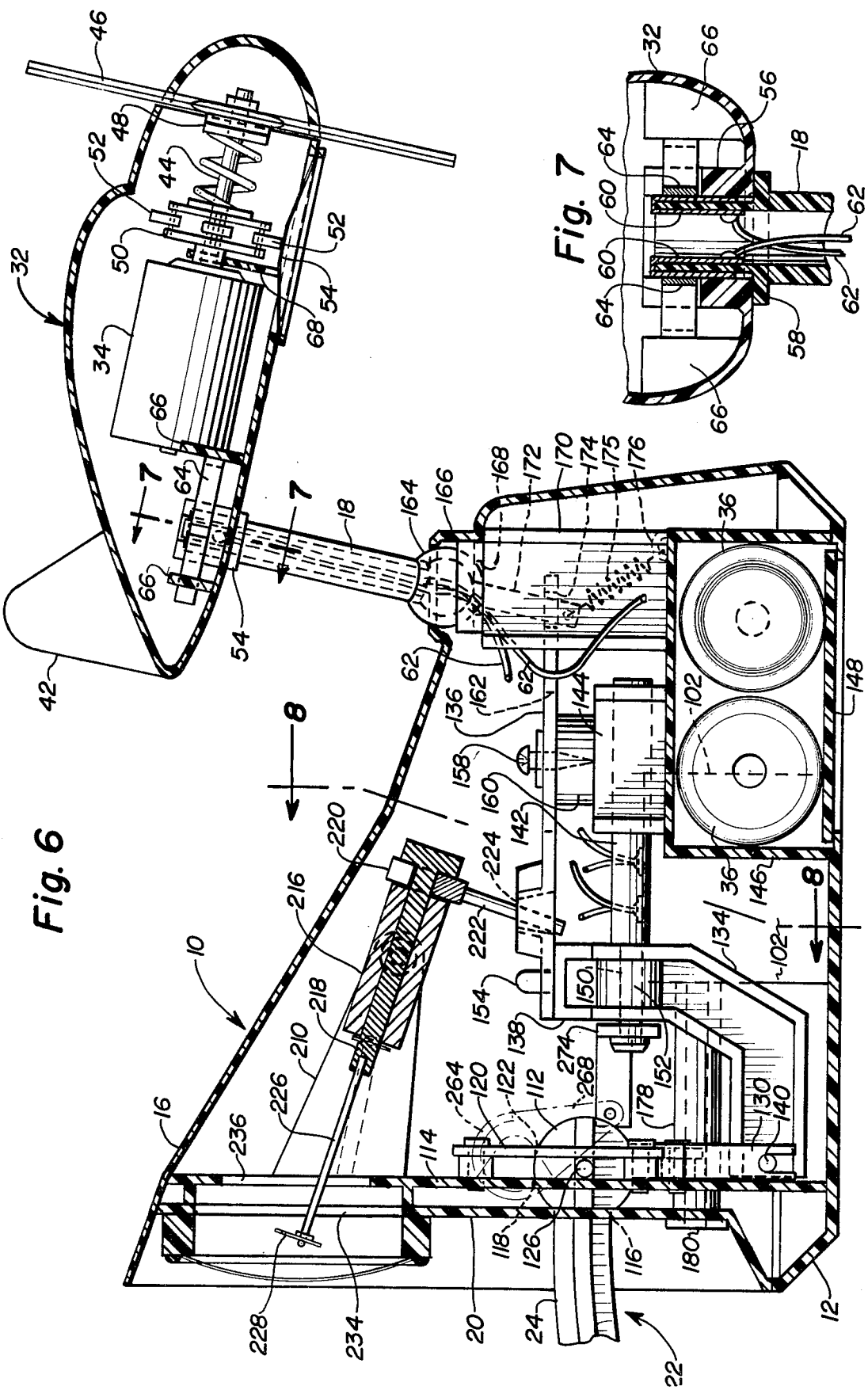

TOY AEROPLANE FLIGHT SIMULATING CONSOLE

BACKGROUND OF THE INVENTION

Toy-type aeroplane flight simulating consoles and mechanism have been developed heretofore. In the prior devices, toy model aeroplanes have been mounted for movement relative to different types of supports, the movement generally being effected by links or cables and actuated by a pivoted rudder bar and a simulated joystick. Typical examples of this type of prior device are illustrated in U.S. Pat. Nos. 1,973,592 to Weisinger, dated Sept. 11, 1934 and 2,034,298 to Holman, dated Mar. 17, 1936.

Actual aviation trainer mechanisms and units also have been developed in which a small model aeroplane is mounted upon a housing for various manipulations by either a joystick or control wheel, as well as foot-operated pedals or crossbars, such as a rudder bar. Typical examples of such prior devices are found in U.S. Pat. Nos. 2,526,371 to Laughead et al, dated Oct. 17, 1950 and 3,534,486 to Frasca, dated Oct. 20, 1970. Various other types of aeroplane type toys primarily representing consoles and/or instrument panels of an aeroplane have been developed for various purposes of amusement or instruction, typical examples of such devices being found in prior U.S. Pat. Nos. 2,454,693 to Foster, dated Nov. 23, 1948; 3,060,598 to Gilbert et al, dated Oct. 30, 1962; and 3,978,609 to English, dated Sept. 7, 1976.

Particularly for purposes of improving and extending the realism of aeroplane operating consoles of a toy-type, both for amusement and instruction, the present invention has been made to provide a relatively small and compact toy aeroplane flight simulating console, providing improvements over such prior devices referred to above and details of which are set forth hereinbelow:

SUMMARY OF THE INVENTION

It is among the principal purposes of the present invention especially to provide a small, compact housing, which, with the exception of means to support a small model aeroplane and the outer end of a simulate joystick and motor throttle operating handle, completely encloses all mechanism in the housing of the console and realistic dials having actual operating needles and hands are supported upon an instrument panel from the lower portion of which said aforementioned portions of a joystick and motor throttle lever project, said console being of a size and type also having a base readily adapted to be supported upon a table or low cabinet so as to be conveniently manipulated by a child or young person, the joystick being operable to dispose the model aeroplane at ascending and descending attitudes and also at left-hand and right-hand banking attitudes simply by moving a single relatively short upright staff respectively about horizontal transverse and longitudinal axes respectively at a right-angle to each other, said staff being supported for such movements by a ball and socket unit and purely mechanical means are enclosed within the housing to effect such movement of said staff and aeroplane by said joystick.

Another object of the invention is to detachably connect the toy aeroplane to the upper end of said staff by means of a socket formed in the fuselage of the aeroplane for frictional engagement with the upper end of said staff and electrical contacts respectively are formed, in said socket and upon the upper end of said staff, to establish an electric circuit between an electric motor mounted in the forward end of the fuselage of the aeroplane to rotate a propeller on the nose thereof and actuate said motor by D.C. batteries mounted in the housing of the console and connected in circuit with a rheostat actuated by said simulated motor throttle lever, the propeller of the aeroplane preferably being connected to the drive shaft of the motor by a safety clutch in order that accidental contact of the rotating propeller will not cause injury to anyone engaging it, and as another preferred embodiment of the invention, the shaft of the motor operates a noise-generating impeller operable against the diaphragm to produce the simulated noise or sound of a motor, operation of the rheostat causing the electric motor to drive the propeller and sound-generating mechanism at various speeds in accordance with the setting of the simulated throttle lever.

A further object of the invention is to operate said aforementioned mechanical mechanisms by which the hereinabove described attitudes of the toy aeroplane are achieved and all of which are enclosed within said housing, by means of an elongated lever disposed substantially horizontally and supported for both pivotal and longitudinal slidable movement relative to a fixed pivot in the housing which engages said lever intermediately of the ends thereof, the pivotal movement being about a vertical axis and one end of said lever being connected flexibly to a depending end on the aforementioned staff below the ball formed thereon, whereby movement of said elongated lever about its pivot moves said staff about a longitudinal horizontal axis to dispose the model aeroplane respectively in right-hand or left-hand banking attitudes, whereas longitudinal movement of said lever effects movement of said depending end of the staff about a transverse horizontal axis to move said staff to dispose said aeroplane in ascending and descending attitudes, pivotal movement of said elongated lever being effected by an additional pivoted lever of irregular configuration interconnected between said simulated joystick and the opposite end of said elongated lever.

Still another object of the invention ancillary to the immediately foregoing object is the provision of a ball and socket unit to support the inner end of said simulated joystick, the ball being connected to the joystick and the socket being fixed relative to the housing and said ball also having a depending projection for engagement of the lower end thereof with one end of said aforementioned additional pivoted lever which is pivotally supported intermediately of its ends upon a horizontal longitudinally movable elongated slidable pivot member supported by a fixed horizontal slide bearing in the housing and capable of being moved slidably to carry said additional pivoted lever toward and from the axis of the pivot for said elongated lever when said simulated joystick is moved about said horizontal transverse axis to effect slidable movement of said elongated lever and thereby dispose the model aeroplane in ascending and descending attitudes as described above.

One further object of the invention ancillary to the foregoing objects is to also support the ball connected to the simulated joystick for movement about a longitudinal horizontal axis and thereby cause said additional pivoted lever to be moved pivotally about its pivot on one end of said elongated longitudinally slidable horizontal pivot member and thereby arcuately move the upper, opposite end of said additional pivot lever to effect pivotal movement of said elongated lever about the pivot therefor and thereby move the staff about its longitudinal horizontal axis to dispose the model aeroplane in either right-hand banking or left-hand banking attitudes.

One further object of the invention is to provide a link connected to the pivot end of said elongated longitudinally slidable horizontal pivot member and movable therewith in slidable movement to effect operation of interengaging gear mechanism to operate the pivoted finger for a dial to reflect simulated extent of ascent and descent of the model aeroplane when the staff is pivotally moved about its horizontal transverse axis by the simulated joystick.

A still further object of the invention is to provide additional gear mechanism associated with another needle pivotally movable on a simulated speed-indicating dial on the instrument panel, said gear mechanism being operated incident to the motor throttle being moved to vary the speed of the motor of the aeroplane and thereby simulate such speed rates by said dial.

One additional object of the invention is to provide on the instrument panel a fixed line simulating the wing of the aeroplane and provide rearwardly of said instrument panel, a bearing sleeve pivoted for movement adjacent the opposite end of said elongated lever from that which is connected to the depending projection on said staff, said movement being about a horizontal axis and said sleeve supporting rotatably a shaft which extends forwardly from the sleeve and supports a transverse needle simulating the horizon and movable with respect to said aeroplane-indicating line on a dial on said instrument panel, the opposite end of said shaft having a crank thereon depending downwardly and received within a socket in said elongated lever, whereby pivotal movement of said elongated lever will effect rotation of said shaft and corresponding angular movement of said needle connected thereto incident to movement of said simulated joystick to dispose said aeroplane in left-hand or right-hand banking attitude.

One further object of the invention is to provide a sound-generating unit within the housing and a jack upon the instrument panel which receives noise from said unit, said jack being adapted to have one end of a cord from a headpiece with earphone connected thereto and thereby transmit such sounds to said earphones.

Still other objects of the invention are to provide various types of imitation gages and dials, preferably of a translucent nature, formed upon the instrument panel and having an electric bulb of low capacity positioned behind such translucent members which preferably are in bank-like arrangement and thus, are illuminated when the circuit for the electric motor is completed and functioning as controlled, preferably by a master on/off switch, also mounted in said circuit.

Details of the foregoing objects and of the invention, as well as other objects thereof, are set forth in the following specification and illustrated in the accompanying drawing comprising a part thereof.

BRIEF DESCRIPTION OF THE DRAWINGS

FIG. 6 is a vertical sectional elevation showing details of the console and the model aeroplane supported thereby, as seen generally on the line 6—6 of FIG. 1, part of the forward portion of the joystick having been omitted from said figure.

FIG. 7 is a small further enlarged fragmentary vertical sectional view showing part of the mounting mechanism for the model aeroplane on its support member, as seen on the line 7—7 of FIG. 6.

DETAILED DESCRIPTION OF THE PREFERRED EMBODIMENT

The present invention comprises a console upon which a model aeroplane is mounted and mechanism is contained entirely within the housing for purposes of positioning the model aeroplane in various attitudes, such as climbing, descent, left bank and right bank, in addition to varying the speed of the propeller on the forward end of the aeroplane and associated with sound-generating mechanism simulating the motor of an aeroplane of the piston type, whereby the console is adapted not only for amusement but also incidental limited education of persons, especially children who manipulate certain simulated mechanism found in full scale aeroplanes, such as a joystick and throttle lever. Particularly for purposes of minimizing the cost of manufacturing and assemblying the various components into a finished product, as far as possible, substantially all of the components are formed by molding the same from preferably rigid type plastic material, certain of the elements being molded from such material which has been appropriately colored to distinguish the various elements where desirable. Various types of gages and indicators also are included on the front face or panel of the console to render the operation of the mechanism more realistic and meaningful.

Figure 2:
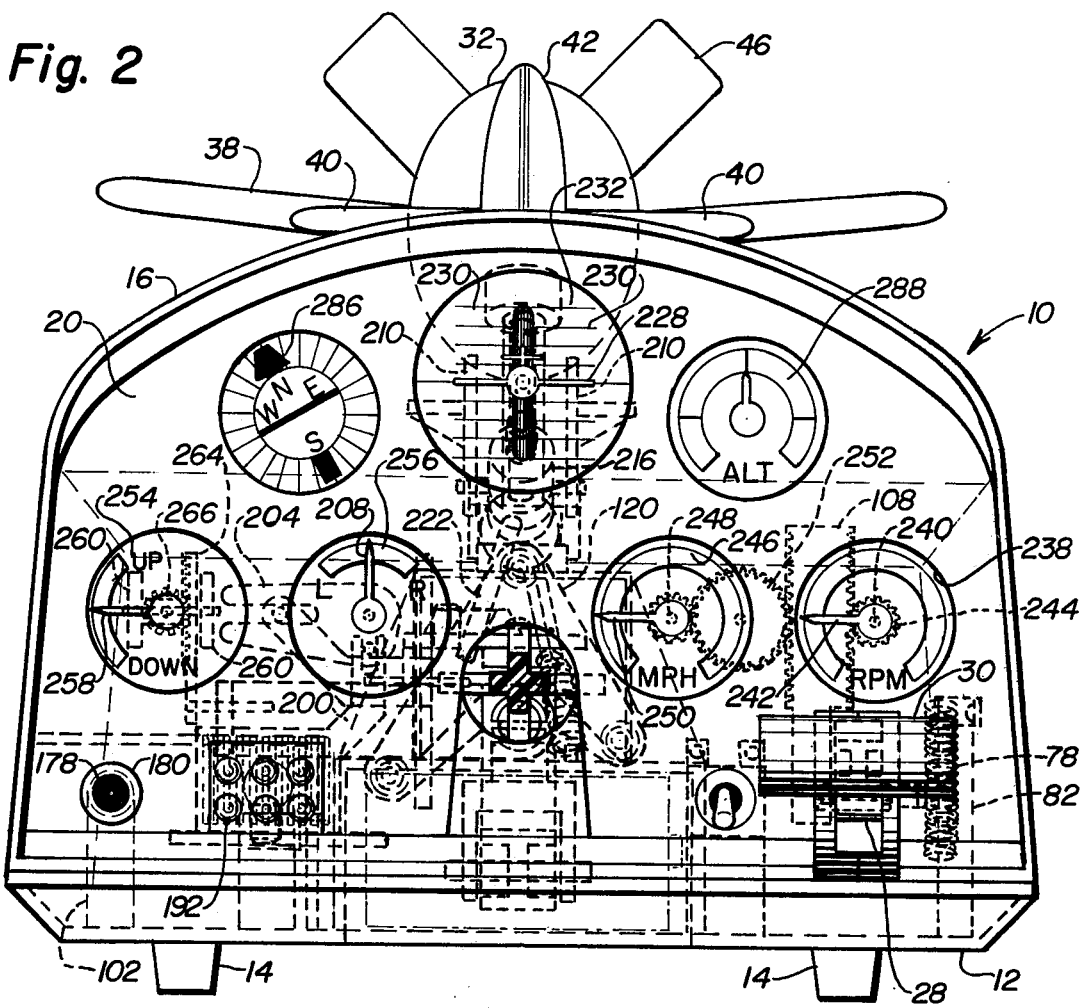
FIG. 2 is a vertical elevation of the front face of the console shown in FIG. 1, but in which the joystick shown in the central portion of the figure from which the handle has been removed and the remainder has been cross-sectioned.
Figure 3:
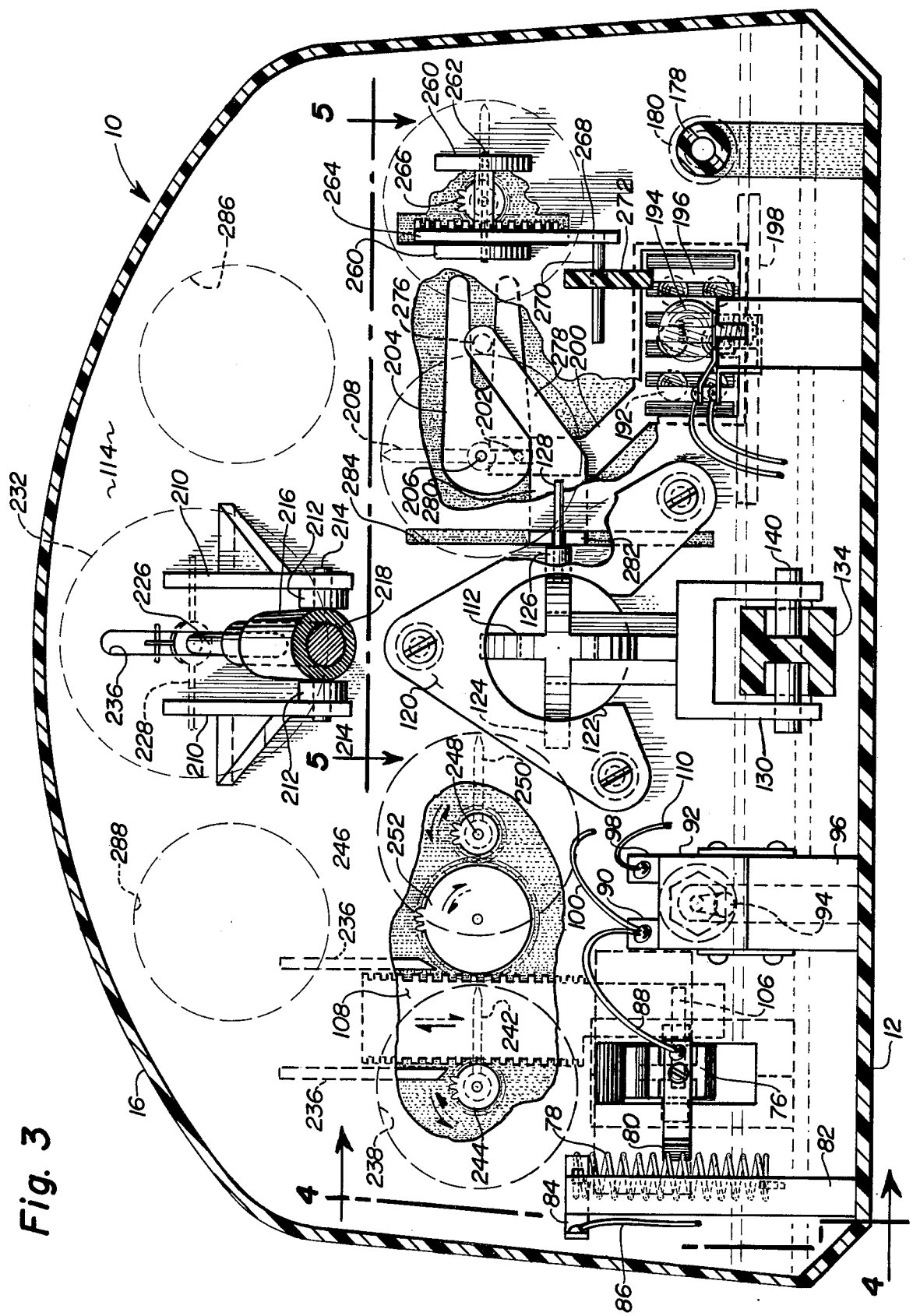
FIG. 3 is an enlarged vertical sectional elevation of the interior of the console housing shown in FIG. 1, as seen on the line 3—3 thereof and looking forwardly toward the rear side of the front panel of said console.

To a certain extent, features of the present invention have been adapted from relatively full-scale educational devices, certain of which are referred to hereinabove but, in adapting the same to a relatively small, so-called table-type model of a flight simulator console, particularly for purposes of rendering the mechanism relatively compact, considerable development and design has been required to produce the desired operating effects, details of which are as follows:

The console 10 comprises a base 12, best shown in FIG. 3, from which a plurality of short supporting feet 14 extend for engagement with a suitable supporting surface, such as table or the like, said base preferably is molded from plastic material of rigid nature and the shell-like housing 16 also is molded from this type of material and is attractively provided in dome-like configuration. Especially as viewed in FIG. 6, which is a vertical sectional view, it will be seen that the housing 16 has its greatest dimension at the forward end, which is on the left, as seen in FIG. 6, and slopes toward the rear end from which a substantially vertical single staff or post 18 projects for various movements described hereinafter. Projecting forwardly from the front face 20 of the console is a joystick 22, which is somewhat L-shaped and includes a forwardly extending shank 24 and a vertically upstanding handle 26 arranged for ready engagement by a hand of an operator. In addition, a throttle lever 28 having a transverse handle 30 on the outer end thereof also projects from the front face 20 of the console and with the exception of said joystick, throttle lever and staff 18, which supports the model aeroplane 32, all other components and especially the means by which the various dials and indicators are actuated, are enclosed within the housing 16 in a very compact manner due to the fact that, in general, the console of the aeroplane, as shown particularly in FIGS. 1, 2 and 6, are approximately full-scale, but this indication is intended to be exemplary, rather than restrictive.

THE MODEL AEROPLANE

Figure 1:
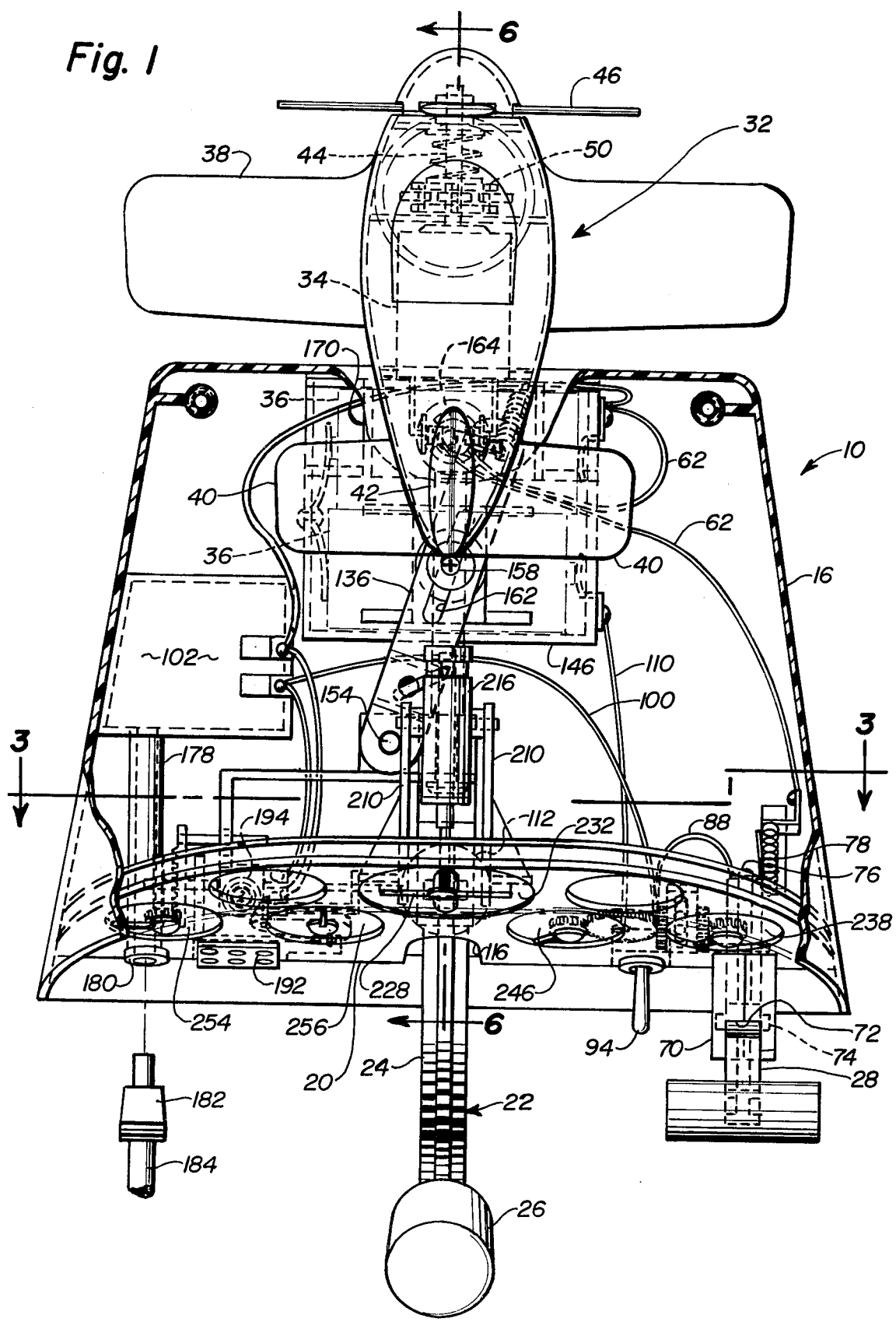
FIG. 1 is a top plan view of the toy aeroplane flight simulator console from which part of the top cover has been removed to render the housing fragmentary and disclose details of the mechanism contained in said console housing.

Referring especially to FIGS. 1, 2 and 6, the model aeroplane comprises a relatively realistic, but stubby configuration of fuselage 32 that is molded from plastic material and is hollow to support preferably an electric motor 34. Said motor preferably is of the D.C. type, due to the fact that it is powered by preferably a plurality of suitable dry cell batteries 36, shown best in FIG. 6. Projecting from opposite sides of the fuselage is a pair of wings 38, rear elevators 40, and a tail rudder 42.

The shaft 44 of the motor 34 extends forwardly and loosely supports a multi-bladed propeller 46 on the forward end thereof, said propeller being driven by the shaft 44 through the medium of a spring-pressed clutch 48 for safety purposes, in the event someone would accidentally physically contact the propeller while it is rotating, said clutch providing adequate slippage for such safety purposes.

In addition to operating the propeller 46 in a safe manner, the motor shaft 44 operates a motor noise-generating beater element 50, which comprises, for example, a pair of discs having circumferentially-spaced pins extending therebetween which support in very loose manner, metal rings 52, best shown in FIG. 6, which when rotated by the member 50 are extended radially outward and beat upon a fixed diaphragm 54 mounted in the belly of the fuselage 32 and produce a realistic imitation of the sound of a piston-type aeroplane motor. Due to the fact that the motor 34 is of the D.C. type and is powered by the batteries 36, control mechanism actuated by the throttle lever 28 and described hereinafter is adapted to operate the motor 34 at various speeds and the faster the speed, the more rapid is the percussion imparted by the rings 52 against the diaphragm 54.

Figure 11:
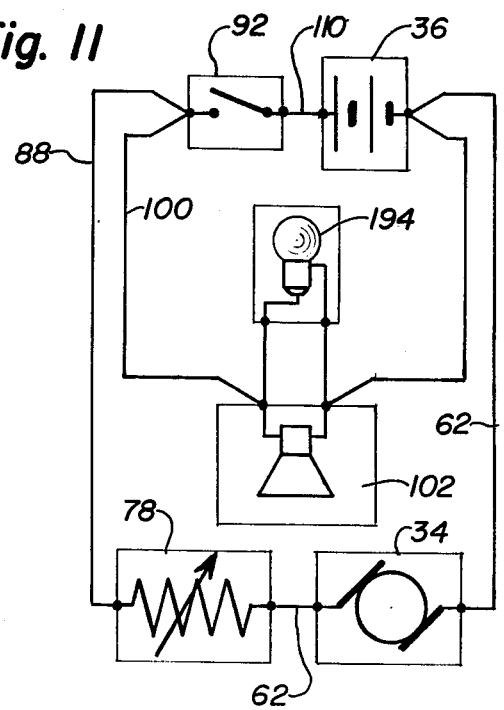
FIG. 11 is an electrical wiring diagram of the circuitry shown fragmentarily in certain of the figures and also in substantial detail in FIG. 1.

The fuselage 32 has a socket 56 molded thereinto, said socket receiving the upper end of the staff 18, as shown best in detail in FIG. 7. A shoulder 58 on said staff 18 limits the insertion of the socket 56 onto the same. In view of the fact that the staff 18 and fuselage 32 are both molded from plastic material which is of electrical insulation nature, the arrangement of electrical contact is quite simple and comprises a pair of flat metal strips 60 on staff 18 soldered to the ends of electric conduit wires 62, comprising part of the circuit shown in FIG. 11, said wires extending down the hollow interior of the staff 18 in a manner described hereinafter. Electric leads from the motor 34 are in the form of flat metal strips which extend substantially axially as viewed best in FIG. 6, and opposite ends thereof are supported by molded plastic ribs 66, the forwardmost one of which, as shown in FIG. 6, also supports the rear end of motor 34, while the forward end thereof is supported by an additional forward plastic member 68.

Although not shown in detail, it is preferable that the inner surface of the socket 56 which engages the upper end of the staff 18 upon which the electric contacts 60 are mounted, preferably are provided with opposite flat parallel surfaces respectively on said co-engaging members and thereby prevent rotation of the fuselage 32 with respect to the staff 18. Strip contacts 60 are U-shaped, as seen in FIG. 7, and preferably the flat strip contacts 64 are bowed inwardly for engagement with the contacts 60, as can be visualized from FIG. 7, the nature of the contacts 64 preferably being resilient for effective electrical contact with the mating contacts 60.

THROTTLE UNIT AND SYSTEM

Figure 4:
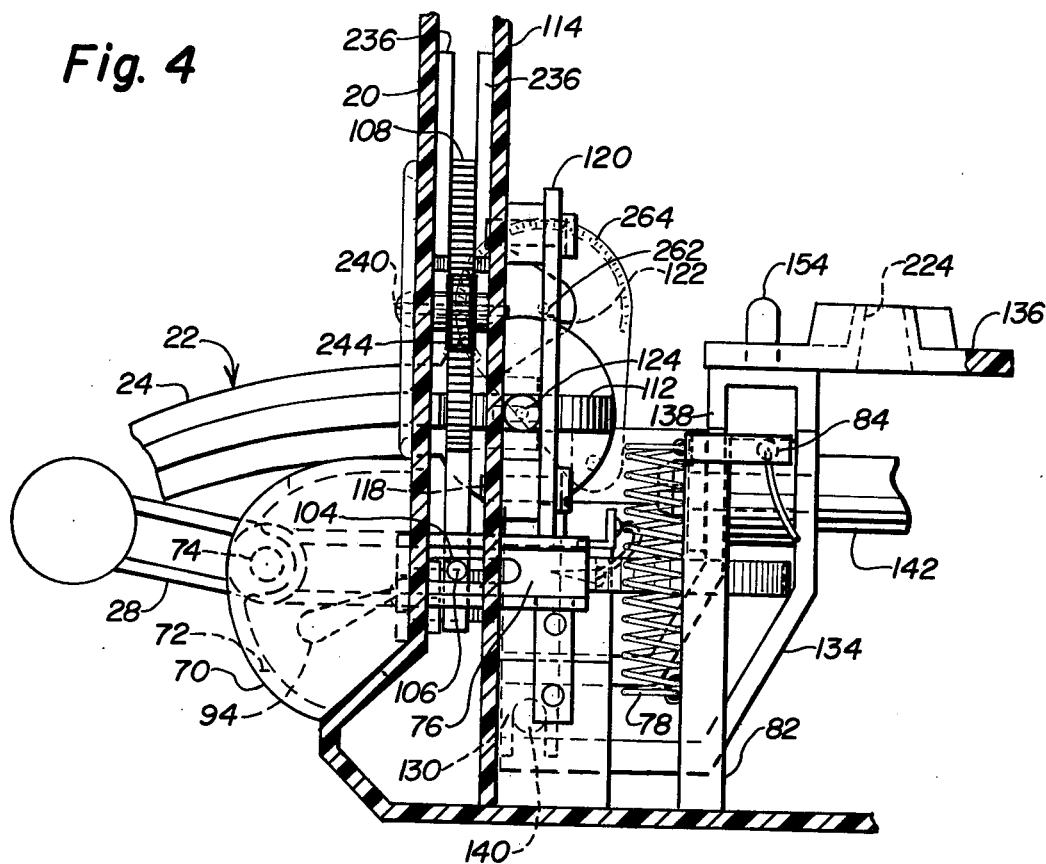
FIG. 4 is a fragmentary sectional view on a scale similar to that used in FIG. 3, showing a side elevation of certain details within the console, as seen on the line 4—4 of FIG. 3.

Referring at least to FIGS. 1 and 4, it will be seen that the throttle lever 28 is pivotally supported by small arcuate housing 70 which contains a slot 72, shown in said figures, within which the lever 28 operates through a limited arc, the lever being supported by a bearing pin 74, the opposite ends of which are received in appropriate molded bearings in the housing 70. The inner end 76 of throttle lever 28 projects through the front face 20 and supports on said inner end, part of current-varying mechanism which is specifically shown in the form of a coiled rheostat 78, which extends more or less vertically, as best shown in FIG. 4, and a resilient metal slide 80 on end 76, best shown in FIG. 3. While this specific type of current-varying mechanism is illustrated, it is to be understood that the invention is not to be restricted to said specific type inasmuch as other equivalent types of current-varying mechanism may be substituted therefor without departing from the spirit of the invention.

The opposite ends of the rheostat coil 78 are supported by a plastic post 82 of insulating nature, the upper end thereof having a metal contact 84, see FIG. 3, to which one end of an electric lead wire 86 is connected. Similarly, another electric lead wire 88 is connected at one end to said metal slide 80 and the opposite end is connected to a metal pole 90 of master ON-OFF control switch 92, having a forwardly extending operating lever 94. The switch is supported in appropriate insulated manner by a vertical plastic post 96, which extends upward from base 12, as best shown in FIG. 3. The opposite pole 98 of said switch has another lead wire 100 connected thereto, which, as shown in FIG. 1, extends to one pole or contact of an electric type noise-producing unit 102, details of which are described hereinafter.

Referring to FIG. 4, it also will be seen that the inner end 76 of the throttle lever 28 has a slot 104, which extends longitudinally thereof and receives a pin 106, which extends laterally from a vertically movable slide 108, which also is well shown in FIG. 3, and is provided with rows of rack teeth on opposite edges thereof respectively for purposes of operating indicating needles of the plane and motor speeds indicated by dials shown in FIG. 2, details of which are described hereinafter. By means of the mechanism and circuitry described immediately above, it will be seen that the speed of the motor 34 in the fuselage 32 readily may be varied in a realistic manner by an operator moving the handle 30 of the throttle lever 28 upwardly and downwardly, as desired. Also, current is supplied to master control switch 92 and coiled rheostat 78 by another lead wire 110, shown best in FIG. 1, extending to one of the batteries 36.

AEROPLANE POSITIONING MECHANISM

The manually-operable handle 26 of joystick 22 may be moved about a horizontal longitudinal axis selectively to dispose the plane in left bank or right bank attitudes and, in addition, said joystick may be moved about a horizontal transverse axis pivotally by moving the handle 26 upwardly and downwardly respectively to dispose the plane selectively in climbing or descending attitudes. Said axes are in perpendicular relationship to each other and extend through a swivel mounting for the inner end of shank 24 of the joystick in the form of a spherical ball 112, best shown in FIG. 3. Said ball is not solid and quadrants thereof have been removed to form a pair of transversely related circular webs functioning the same as a solid sphere, as can be visualized especially from FIG. 3. Referring to FIG. 6, it will be seen that directly behind and parallel to the front face panel 20 is an auxiliary panel 114, which also preferably is formed of plastic material. Front face 20 has an opening 116 through which shank 24 of the joystick extends and inward therefrom, the auxiliary panel 14 has a circular opening 118 therein slightly forward of the center of the ball 112, which slidably engages the rim of said opening, and a substantially triangular shape supplemental plate 120, see FIG. 3, has a similar circular opening 122 therein which is partially interrupted at the bottom thereof, the rim of said opening being slidably engaged by another portion of the ball 112 for a limited oscillating movement therein, the plane of the supplemental plate 120 being a short distance rearward of the center of the ball 112, which is capably supported between the openings 118 and 122.

Figure 5:
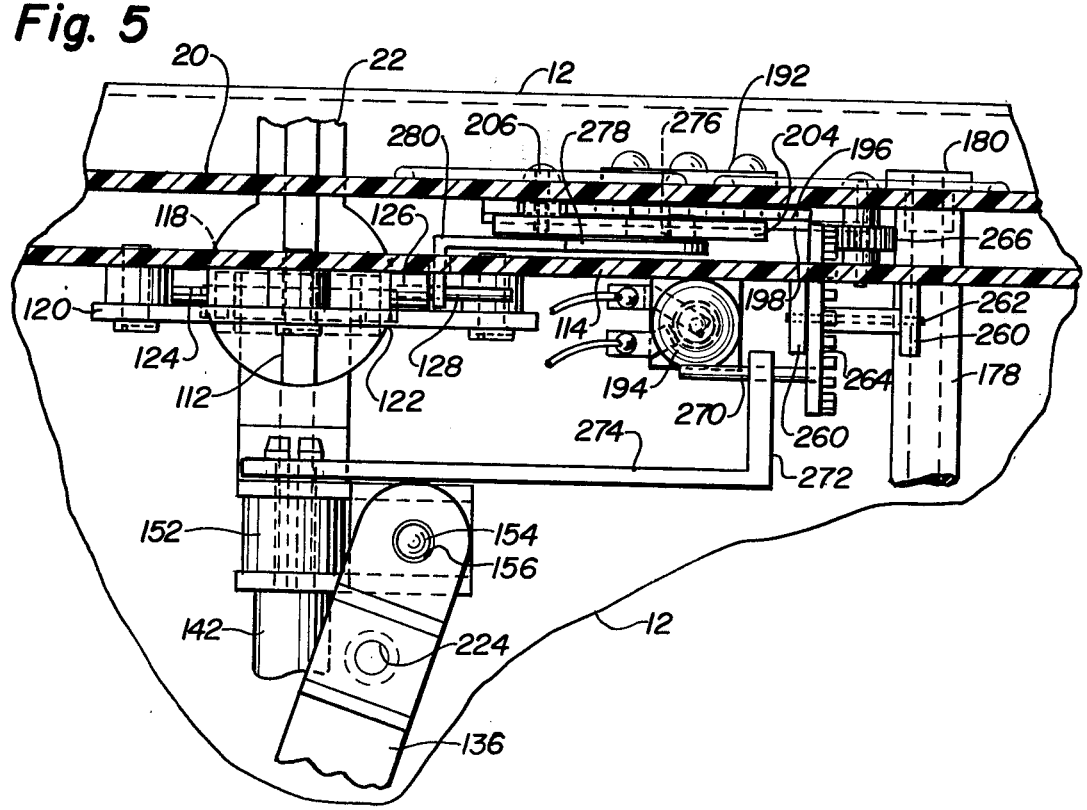
FIG. 5 is a fragmentary horizontal plan view on the same scale as FIGS. 3 and 4 and showing other details within the console, as seen on the line 5—5 of FIG. 3.
Figure 8:
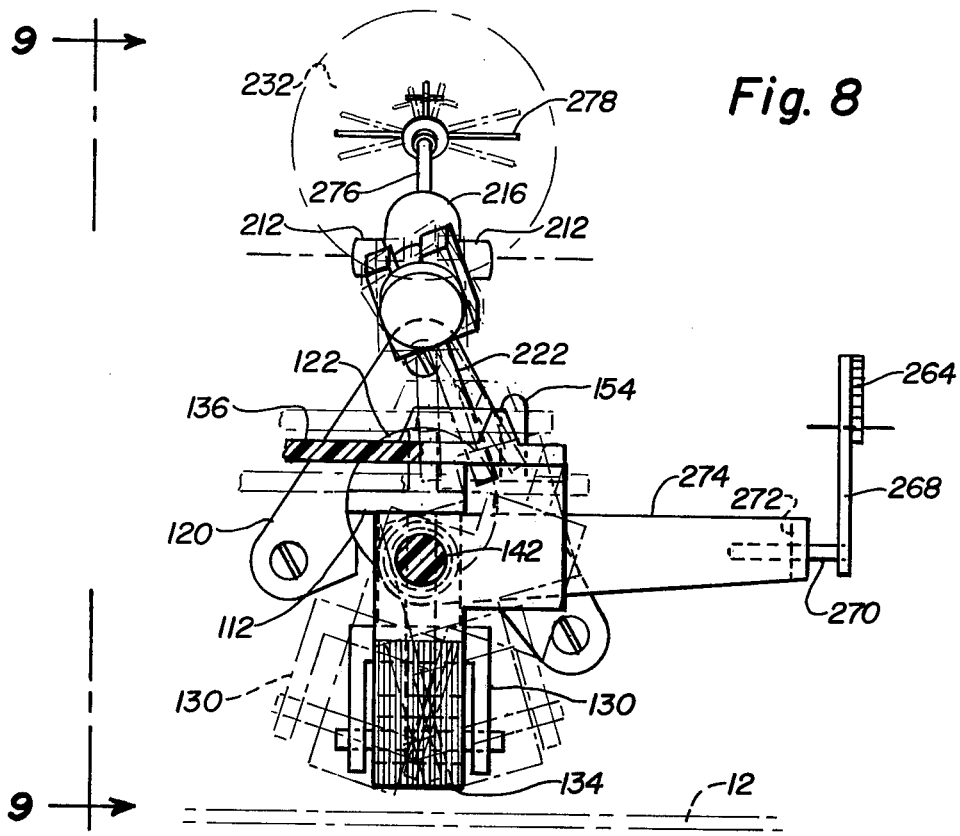
FIG. 8 is a fragmentary vertical sectional view of a certain portion of the interior of the console, as seen on the line 8—8 of FIG. 6.

Further to stabilize the pivotal movement of the ball 112 and the joystick about the aforementioned horizontal transverse axis, tranversely opposed sides of the ball 112 are provided with short trunnions 124 and 126, which are rotatably and closely disposed between the parallel panel 114 and plate 120, as best shown in FIGS. 5 and 6. The trunnion 126 also has a smaller diameter pin 128 extending axially therefrom for purposes to be described.

Depending from the ball 112 is a yoke 130, clearly shown in FIGS. 3 and 6, which receives between the legs thereof, one end 132 of an irregularly-shaped link or lever 134 which is additional to an elongated lever 136, one end of which is associated with the upper end 138 of irregular lever 134. The preferred shape of irregular lever 134 is best shown in FIG. 6 and, as seen in FIG. 3, in cross-section, the same is substantially H-shaped to provide strength thereto in view of the important and somewhat strenuous requirements to which said lever is subjected, as described hereinafter.

The lower forward end of irregular lever 134 is provided with a transverse pin 140, opposite ends of which are received within slots extending upward from the lower ends of the legs of yoke 130, as shown in FIG. 6. Accordingly, when the joystick 22 is pivotally moved within a vertical plane for rotation about the axis of the trunnions 124 and 126, the pin 140 will be moved inwardly in a substantially horizontal path to project lever 134 inwardly and particularly move the upper end thereof in such direction so that, in turn, it also projects an elongated longitudinally slidable horizontal pivot member 142, which preferably is a shaft that is circular in cross-section, but may be of other transverse geometrical configuration, if desired, said shaft being supported by a stationary horizontal guide bearing 144 fixedly supported within the housing 16, said support being positioned for convenience and compactness directly over the internal housing 146, see FIG. 6, within which the batteries 36 are contained and from which they are removable by dislodging a cover 148 in the bottom 12 of the housing.

The forward end of shaft member 142 fixedly supports a smaller diameter shaft extension 150 which extends through an appropriate bearing member 152 in the upper portion of the irregular lever 134 to support said upper end thereof for limited pivotal movement about a horizontal axis and, by operation of the yoke 130, as described above, the movement of both the lever 134 and shaft member 142 is horizontal in the direction extending longidutinally of the major axis of housing 16.

The upper end of lever 134 is provided on the upper surface thereof with a small stud 154 that extends through a hole 156 of larger diameter than said stud, as shown in FIG. 5, for purposes of providing a somewhat sloppy connection permitting limited play therebetween as elongated lever 136 is pivotally moved about the axis of pivot 158, which is threaded into a fixed vertical support 160, which is secured to fixed bearing 144. The pivotal movement of elongated lever 136 occurs by reason of an elongated slot 162, see FIG. 1, in said lever through which the pivot screw 158 extends and thereby permits slidable movement of the lever with respect to the pivot screw 158, as well as pivotal movement. Slidable movement occurs when the handle of the joystick is moved forwardly and downwardly to project the additional pivoted lever 134 rearwardly in slidable manner when the movement of the joystick is about the horizontal transverse axis of ball 112. However, when the upstanding handle of the joystick is moved pivotally to one side or the other to cause the ball 112 to move about a horizontal longitudinal axis and thereby arcuately move the yoke 130 and lower end of irregular pivoted lever 134 about the axis of the horizontal shaft member 142, the small stud 154 will pivotally move the elongated lever 136 about the axis of said pivot screw 158. During the latter pivotal movement of the joystick about the longitudinal horizontal axis, such movement is restricted to said axis due to the slidability of the trunnions 124 and 126 between the parallel panel 114 and plate 120.

The selective pivotal and longitudinal movement of the elongated lever 136 is for purposes of shifting the position of the model aeroplane 32, either to indicate ascent or descent attitudes, or left bank and right bank attitudes. This is accomplished by means of the staff 18 being provided with another ball 164 disposed within a socket portion 166 in the upper rearward portion of the housing 16, as shown clearly in FIG. 6, the lower portion of the ball being spherically slidable within a circular opening 168 formed in the horizontal member attached to the upper end of box-like extension 170 arising from the top of internal housing 146 and fixed thereto, said extension of the housing also preferably being formed from rigid plastic material, the same as the housing 16.

Depending axially from the staff 18 is a rigid extension 172 which extends through a hole 174 in the end of elongated lever 136 opposite the forward end therof in which hole 156 is formed, said hole being larger than the transverse dimension of extension 172 to provide an effective but somewhat sloppy fit in the relative pivotal movements of the lever 136 and extension 172. A tension spring 175 is connected to the lower end of extension 172 and also to an eyelet 176 to maintain ball 164 seated in opening 168.

From the foregoing, it will be seen that pivotal movement of the handle of the joystick about the longitudinal horizontal axis of the ball 112 shifts the staff 18 and correspondingly, the aeroplane 32 about a substantially longitudinal axis to indicate left banking attitude or right banking attitude, while when the joystick is moved about its transverse horizontal axis of the trunnions 124 and 126, the elongated lever 136 is shifted longitudinally by means of the slot 162 slidably moving relative to pivot screw 158, whereby the ball 164 on staff 18 is moved substantially about a transverse horizontal axis to dispose the plane 32 either in ascending attitude or descending attitude. The position of the plane with respect to the horizon, either above or below or in angular relationship thereto, is indicated on dial mechanism in the upper midportion of the front face 20 of the console, as described in detail hereinafter.

Figure 10:
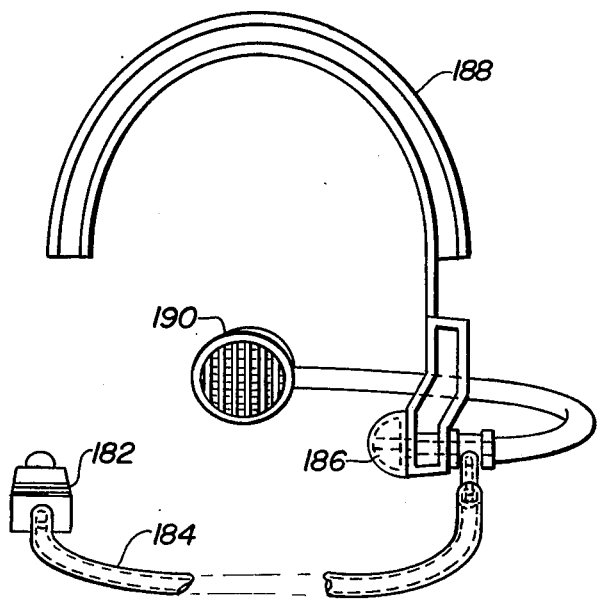
FIG. 10 is a perspective view of a toy microphone and headset connectable to the console and comprising part of the invention.

In addition to the motor-simulating noise generated by the beater element 50 and fixed diaphragm 54, as described hereinabove, the console also is adapted to contain the aforementioned electrically-operated noise-producing unit 102, which, for example, is indicated somewhat diagrammatically as a cubical box, disposed in the lower portion of the console upon base 12 and adjacent the left-hand side, as shown in FIG. 2, said box having a noise-transmitting tube 178 extending forwardly therefrom and terminating in a socket 180, see FIGS. 2 and 6, within which a plug 182, see FIG. 10, may be inserted for purposes of connecting the flexible tube 184 to the unit 102 and by which noise is transmitted to the earplug 186 of headpiece 188, which also preferably has a microphone 190 communicatively connected to the earplug 186 and thereby rendering use of the invention more realistically than if the equipment shown in FIG. 10 were not included.

Further to improve the realism of the console, one portion of the front face 20 thereof is provided with a simulated bank of signal lights 192, having a plurality of semi-globe-like projections thereon as shown in FIGS. 1–3, said projections being of different colors, if desired, and at least translucent. Behind the same, a small wattage electric bulb 194 is mounted and is connected in the electric circuit by suitable conduits indicated in FIG. 11. Further, to moreover increase the realism, a slotted shutter slide 196, shown best in FIG. 3, is supported rearwardly of the bank of lights 192 and is horizontally moved relative to a bottom guide 198 by means of an angularly upward extending arm 200, which has a forked upper end, see FIG. 3, receiving a pin 202, which is short and projects from one face of pivoted yoke 204, shown in FIGS. 3 and 5, which is associated with one of the dials described hereinafter, that is moved about an axis 206 of a dial finger 208.

PLANE ATTITUDE-INDICATING SYSTEM

Figure 9:
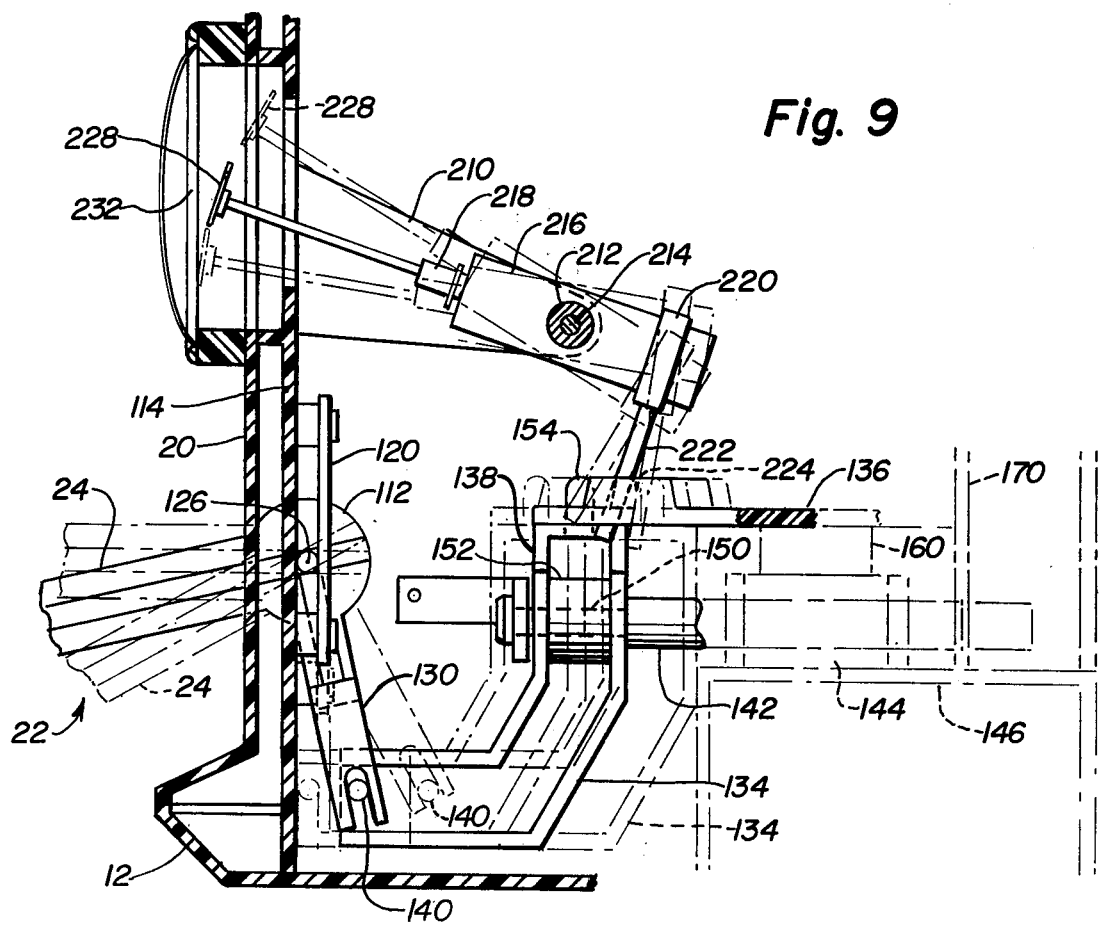
FIG. 9 is a fragmentary side elevation of the details within the console shown in FIG. 8, as seen from the line 9—9 of FIG. 8.

Referring particularly to FIGS. 1–3, 6, 8 and 9, there is shown, especially in FIGS. 6 and 9, a pair of rearwardly extending, parallel ears 210, which are connected at the forward ends thereof to the inner face of the auxiliary panel 114, the opposite ends being provided with bearings 212, which respectively receive trunnions 214, extending from opposite sides of a sleeve 216 which actually is an elongated bearing, supported for pivotal movement about a horizontal transverse axis fixed relative to the inner ends of the ears 210. Said sleeve supports a shaft 218 rotatably but secured against longitudinal movement therein, the inner end of said shaft having a yoke 220 secured to a squared portion near the innermost end of the shaft, the yoke have a depending pin 222 extending therefrom into a socket hole 224, formed in the forward portion of the elongated lever 136, said socket hole being substantially larger than the pin 222 to afford a somewhat sloppy fit to compensate for certain angular movements existing between the two elements.

Projecting forwardly from the shaft 218 is a small rod 226, having on the outer end thereof a transverse needle indicating the horizon with respect to a series of fixed horizontal lines 230, see FIG. 2, on the dial 232 in the central upper portion of the front face 20 of the console.

When the joystick 22 is moved pivotally within a vertical plane which results in inward slidable movement of the additional irregular lever 134 and pivot shaft member 142, which results in movement of the ball 164 on staff 18 about a transverse horizontal axis to dispose the model plane 32 in ascending attitude, the resulting slidable movement of elongated lever 136 effects rearward movement of the socket hole 224 and resultingly effects counterclockwise movement of bearing sleeve 216, as viewed in FIG. 6, with the result that the rod 226 and needle 228 thereon are moved downwardly with respect to the horizontal lines 230 to indicate that the plane is rising. Conversely, when the joystick 22 is moved in reverse to the aforementioned pivotal movement to restore the same to its normal uppermost position, reverse slidable movement of the elongated lever 136 is effected to the left, as viewed in FIG. 6, and this results in the ball 164 of staff 18 being moved counterclockwise with the resulting clock-wise movement of the bearing sleeve 216 and elevation of the needle 228 relative to the fixed horizontal lines 230 on dial 232 to indicate an ascending attitude of the plane 32.

Further, when the joystick 22 is moved pivotally about the longitudinal transverse axis thereof, which pivots the irregular lever 134 about the shaft extension 150 and causes pivotal movement of the lever 136 about the axis of pivot screw 158, to cause the ball 164 on staff 18 to be moved about its longitudinal horizontal axis, and thereby results in effecting left banking or right banking attitude of the plane 32, such pivotal movement of lever 136 causes the lower end of depending pin 222 to be moved laterally in one transverse direction or the other, and thereby effect rotation of shaft 218 upon which needle 228 is mounted, causing said needle to be disposed at an angle to the horizontal lines 230 on dial 232 to indicate either left banking or right banking attitudes of the plane with respect to the horizon, depending upon the direction in which the joystick is moved. Movement of the sleeve 216 about its horizontal transverse axis to cause raising and lowering of the small rod 226 relative to the dial 232 occurs by movement of the rod 226 through aligned slots 234 and 236, formed respectively in front face 20 and auxiliary panel 114 spaced inwardly therefrom, as shown in FIGS. 3 and 6.

SPEED-INDICATING DIALS

Referring to FIGS. 2–4 in, the foregoing description with respect to the operation of the rheostat units 78, 80, reference was made to the vertically movable slide 108 which has rows of rack teeth on opposite vertical edges thereof, as clearly shown in FIGS. 3 and 4. Said slide is guided for movement between front face 20 and auxiliary panel 114 in sandwich fashion, as shown in FIG. 4, restriction of movement other than vertical being prevented by guide strips 236, clearly shown in FIGS. 3 and 4. As viewed in FIG. 2, the right-hand dial 238 is positioned substantially in alignment with the throttle handle 30 and preferably indicates the RPM of the motor 34 in the aeroplane 32. To simulate the same, a short shaft 240 has its opposite ends pivotally supported within aligned holes in front face 20 and auxiliary panel 114, as seen in FIG. 4. The forward end of the shaft has an indicating needle 242 formed thereon for movement relative to a circular row of indicia on the dial 238, movement of the needle being effected by means of a small spur gear 244 fixed to shaft 240 and engageable with the adjacent row of rack teeth on slide 108, which, as indicated above, is vertically moved between front face 20 and auxiliary panel 114 by movement of the throttle lever 28.

Similarly, speed of the plane indicated in MPH is simulated on dial 246 in which another shaft 248 is pivotally supported at its opposite ends by holes in front face 20 in auxiliary panel 114, as with the shaft 240 of dial 238, the shaft 248 having another indicating finger 250 fixed thereon, movable relative to the dial 246, the shaft 248 being actuated by a small spur gear on said shaft which meshes with intermediate gear 252 of larger diameter than the spur gear and meshes with the opposite row of rack teeth on slide 108 for rotation thereof as said slide moves vertically and reflects simulated registry of the speed of the plane on the dial 246.

PLANE ATTITUDE-INDICATING DIALS

Referring to the left-hand half of front face 20, as viewed in FIG. 2, there is a pair of dials 254 and 256, dial 254 indicating ascending and descending attitudes of the fuselage 32 of the aeroplane. An indicating needle 258 is rotatably supported upon a shaft extending between holes in front face 20 and auxiliary panel 114, said shaft having a small spur gear 266 fixed thereto, as shown in FIGS. 2 and 5. A pair of transversely spaced bearing members 260, see FIGS. 3 and 5, support therebetween a shaft 262 upon which a segmental arcuate gear 264 is mounted for engagement with a small spur gear 266, which is mounted upon another shaft extending between front face 20 and auxiliary panel 114. The teeth on the segmental gear 264 mesh with said spur gear 266 and rotate the shaft of said spur gear upon the outer end of which the indicating needle 258 is supported for movement relative to the ascending and descending indicating dial 254.

As best seen in FIGS. 3 and 5, the segmental gear 264 has a depending tail portion 268 from which a pin 270 extends to the left, as viewed in FIGS. 3 and 5, said pin extending through a bearing hole in a transverse extension 272 on one end of a horizontal link 274, which is fixed non-rotatably to the outer end of shaft extension 150 on slidable pivot shaft member 142, which also is non-rotatable but only is slidable relative to the stationary guide bearing 144, the upper end of link 134 merely being pivotally supported about the shaft extension 150 and not being fixed thereto.

When the joystick 22 is moved about its horizontal transverse axis to project the link 134 and the shaft member 142 longitudinally within the console 16, the horizontal link 274 likewise is moved toward and from the auxiliary panel 114 in a manner to move the tail portion 268 of segmental gear 264 a limited extent and thereby cause rotation of the small gear 266 and the needle 258 fixed thereto to reflect the ascending and descending attitudes of the plane fuselage 32.

The dial 256 is intended to indicate left banking and right banking of the plane fuselage 32 in which the wings 38 are disposed angularly with respect to the horizon and also indicated by the needle 228 of dial 232, the extent of banking being simulated upon dial 256, upon which the dial finger 208 is movable by being fixed to a shaft 206, the movement of which is effected by the aforementioned pivoted yoke 204. The slot in the yoke 204 receives a pin 276 on the outer end of laterally and upwardly extending arm 278, which projects from a horizontal portion 280 which is positioned between the inner surfaces of auxiliary panel 114 and pivoted yoke 204, as best seen in FIG. 5. Said horizontal portion 280 has an ear 282, which slides vertically in perpendicular guide slot 284, see FIG. 3, formed in auxiliary panel 114 and vertical movement of the ear 282 is effected by the pin 128 on trunnion 126 extending therethrough. Hence, when the ball 112 moves about its longitudinal horizontal axis, the pin 128, as viewed in FIG. 3, will move vertically up and down and correspondingly, carry the ear 282 and the connected portions 278 and 280 thereon vertically to effect pivotal movement of the yoke 204 and thereby, move the needle 208 relative to the indicia shown in dial 256.

Other simulated indicating means also may be provided upon the outer surface of front face 20, such as shown in FIG. 2 in which a simulated compass 286 is formed at one side of dial 232 and at the other side, a simulated altimeter 288 is formed, but neither are shown to be operative in the present embodiment.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A toy aeroplane flight simulator console comprising in combination:
    (a) A console housing adapted to be supported upon a table or the like and having a front face,
    (b) A substantially vertical single staff projecting upward from a rearward portion of said housing,
    (c) An instrument panel on said front face of said housing,
    (d) A model toy aeroplane having a propeller on the nose of the fuselage thereof and an electric motor in said fuselage connected to said propeller to drive it, (e) Socket means in the lower portion of said fuselage of said aeroplane adapted to be disengageably received upon the upper end of said single staff to attachably connect the aeroplane thereto for support and manipulation of said aeroplane for flight simulating maneuvers about multiple horizontal axes perpendicular to each other, (f) D.C. battery means in said console, (g) A motor throttle lever pivotally supported by said console and positioned forwardly of said instrument panel for manual manipulation, (h) An electric circuit connecting said battery to said motor in said plane and a rheostat engaged by said throttle lever to vary the speed of the aeroplane propeller, (i) Co-engageable contacts in said socket in the fuselage of said aeroplane and on the upper end of said staff and included in said circuit to complete said circuit when said aeroplane is mounted operatively upon said staff for support, (j) A simulated joystick supported within said console housing for substantially universal pivotal movement and having a manually manipulatable handle projecting outwardly and upwardly from and forwardly beyond said instrument panel, (k) Mechanical elements enclosed and concealed entirely within said housing interconnected between said joystick and said staff to tilt said aeroplane upward and downward about a transverse horizontal axis and also sideways in opposite directions about a longitudinal horizontal axis perpendicular to said transverse horizontal axis when said joystick respectively is pivoted about a horizontal transverse axis and about a longitudinal horizontal axis, (l) Motor speed-indicating dial means on said instrument panel connected to and operated by movement of said motor throttle lever, (m) Flight direction-indicating dial means on said instrument panel connected to and operated by movement of said joystick, and (n) A horizontal wing attitude-indicator operable relative to a fixed line on said instrument panel and connected to and operated by said joystick to indicate the level of the wings of the aeroplane relative to the horizon.

2. The console according to claim 1 further including in the rearward portion of said housing support means for said single staff adjacent the lower end thereof comprising a ball and socket unit and the lower terminal end of said staff depending from said ball of said unit and the socket of said unit being stationarily supported by said housing, an elongated lever supported within said housing intermediately of the ends thereof for longitudinal horizontal slidable movement and pivotal movement about a vertical axis, means in one end of said lever connected to said depending end of said staff to effect said aforementioned movement about a pair of horizontal axes perpendicular to each other respectively when said lever is moved pivotally and slidably, and additional pivoted lever means interconnecting said lever to said joystick for actuation of said staff thereby to effect said above-described movements of said staff and correspondingly of the aeroplane supported thereby.

3. The console according to claim 2 further characterized by said additional lever means comprising an irregularly shaped lever member pivotally connected intermediately of its ends to one end of a horizontal elongated pivot member longitudinally slidably supported within a fixed axially extending slide bearing in said housing positioned beneath said elongated lever, said irregularly shaped lever member extending substantially within a vertical plane and the upper end thereof having a movable connection with the end of said elongated lever opposite the end connected to said staff and thereby effect pivotal movement of said elongated lever as aforesaid, and the opposite end of said irregularly shaped lever extending downwardly and forwardly of the pivot thereof and the lower terminal end thereof extending forwardly, another ball and socket unit within said housing rearwardly of said instrument panel and supporting the inner end of said joystick, the ball being fixed to said joystick and the socket being on fixed means within said housing, a projection fixed to and depending from said ball and the lower end of said projection being movably connected to said terminal end of said irregularly shaped lever for fore and aft movement of said lever and said elongated pivot member when said joystick is moved about a transverse horizontal axis and also effect pivotal movement of irregularly shaped lever and said elongated lever when said joystick is moved arcuately about a longitudinal horizontal axis of said socket.

4. The console according to claim 3 further including a link fixed at one end to said pivot for said irregularly shaped lever and movable therewith when said elongated pivot member is slidably moved, a segmental gear supported on a fixed axis rearwardly of said instrument panel, an instrument needle supported on a shaft having a spur gear engaging said segmental gear, and an extension of said segmental gear pivotally connected to the other end of said link and operable when moved to rotate said needle to indicate on another dial on said instrument panel simulated rate of climb or descent of said aeroplane.

5. The console according to claim 2 further including a sleeve bearing pivotally supported for movement about a fixed transverse horizontal axis rearwardly of said instrument panel adjacent said wing attitude indicator, a shaft rotatably mounted within said sleeve bearing and projecting forwardly to support at the forward end a transverse attitude indicating needle operable relative to a plane level indicating line on a dial, a crank on the rearward end of said shaft depending therefrom, a socket on the forward portion of said elongated lever receiving the lower end of said crank and thereby being operable to move said needle up or down to indicate climb or descent of the aeroplane when said lever is slidably moved by said joystick and said shaft being pivotally moved when said elongated lever is moved pivotally and thereby move said shaft and needle thereon pivotally to indicate left or right bank attitude position relative to the horizon.

6. The console according to claim 1 further characterized by said motor speed indicating dial having a needle movably supported upon a shaft rotatably mounted adjacent said instrument panel, a spur gear on said shaft rearwardly of said panel, and cooperating gear means movable by said motor throttle lever when moved to vary the motor speed to actuate said needle to indicate simulated motor speed.

7. The console according to claim 1 further including a sound-generating unit within said housing simulating the sound of the motor, a set of earphones and cord, and a cord jack on said instrument panel connected to said sound-generating unit, whereby when said cord is connected to said jack the sound from said unit will be heard in said earphones.

8. The console according to claim 1 further including a motor noise-simulator in the fuselage of said aeroplane comprising a stationary diaphragm, a shaft for said propeller operated by said motor, and rotatable disc means fixed to said shaft for rotation thereby adjacent said diaphragm and loosely mounted striking elements carried by said disc means for centrifugal projection beyond said disc means to effect contact of said diaphragm of said elements to produce a simulated sound of a motor.

9. The console according to claim 1 further including a shaft for said propeller of said aeroplane driven by said motor, and a safety clutch installed on said shaft between said propeller and said shaft to prevent injury of a person upon contacting said propeller when rotating by releasing said propeller from driving connection to said shaft.

10. The console according to claim 1 further including an electric light bulb supported within said housing rearwardly of said instrument panel and connected in said circuit with said battery, a plurality of simulated gages and dials of translucent nature in a bank-like arrangement on said instrument panel forwardly of said electric bulb, and said circuit including a master on-off switch controlling the connection of said battery to said circuit.

* * * * *